(12) United States Patent
Lohmann et al.

(10) Patent No.: US 10,573,922 B2
(45) Date of Patent: Feb. 25, 2020

(54) HYBRID IONIC ELECTRONIC ENERGY STORAGE DEVICE

(71) Applicant: Robert Bosch GmbH, Stuttgart (DE)

(72) Inventors: Timm Lohmann, Mountain View, CA (US); Paul Albertus, Washington, DC (US); John F. Christensen, Mountain View, CA (US); Boris Kozinsky, Waban, MA (US)

(73) Assignee: Robert Bosch GmbH, Stuttgart (DE)

( * ) Notice: Subject to any disclaimer, the term of this patent is extended or adjusted under 35 U.S.C. 154(b) by 1213 days.

(21) Appl. No.: 14/459,762

(22) Filed: Aug. 14, 2014

(65) Prior Publication Data

US 2016/0365600 A1     Dec. 15, 2016

Related U.S. Application Data (60) Provisional application No. 61/866,078, filed on Aug. 15, 2013, provisional application No. 61/866,456, filed on Aug. 15, 2013.

(51) Int. Cl.
*H01M 10/0525* (2010.01)
*H01M 10/0562* (2010.01)
(Continued)

(52) U.S. Cl.
CPC ........ *H01M 10/0525* (2013.01); *H01G 11/08* (2013.01); *H01G 11/10* (2013.01); *H01G 11/56* (2013.01); *H01M 2/1061* (2013.01); *H01M 4/131* (2013.01); *H01M 4/134* (2013.01); *H01M 4/136* (2013.01); *H01M 4/38* (2013.01); *H01M 4/382* (2013.01); *H01M 4/405* (2013.01); *H01M 10/052* (2013.01); *H01M 10/0562* (2013.01); *H01M 10/0585* (2013.01); *H01M 10/425* (2013.01); *H01M 12/06* (2013.01);
(Continued)

(58) Field of Classification Search
None
See application file for complete search history.

(56) References Cited

U.S. PATENT DOCUMENTS

| | | | |
|---|---|---|---|
| 5,728,482 A | 3/1998 | Kawakami et al. | |
| 6,365,300 B1 * | 4/2002 | Ota | H01M 4/621 429/188 |

(Continued)

FOREIGN PATENT DOCUMENTS

| | | |
|---|---|---|
| FR | 2764737 A1 | 12/1998 |
| JP | 2005534149 A | 11/2005 |
| KR | 10-2011-0057066 A | 5/2011 |

OTHER PUBLICATIONS

International Search Report and Written Opinion corresponding to PCT Application No. PCT/US2014/051076, dated Nov. 20, 2014 (10 pages).

(Continued)

*Primary Examiner* — Tracy M Dove
(74) *Attorney, Agent, or Firm* — Maginot, Moore & Beck LLP (57) ABSTRACT

An electrochemical cell in one embodiment includes an anode including a form of lithium, a cathode, and a composite electrolyte structure positioned between the anode and the cathode, the composite electrolyte structure configured to conduct lithium ions while being electronically insulating, and exhibiting a high polarizability of localized charges.

10 Claims, 5 Drawing Sheets

(51) Int. Cl.

| | |
|---|---|
| H01M 10/42 | (2006.01) |
| H01M 12/08 | (2006.01) |
| H01M 10/052 | (2010.01) |
| H01M 4/38 | (2006.01) |
| H01M 4/40 | (2006.01) |
| H01G 11/08 | (2013.01) |
| H01G 11/56 | (2013.01) |
| H01M 2/10 | (2006.01) |
| H01G 11/10 | (2013.01) |
| H01M 10/0585 | (2010.01) |
| H01M 4/131 | (2010.01) |
| H01M 4/134 | (2010.01) |
| H01M 4/136 | (2010.01) |
| H01M 12/06 | (2006.01) |
| H01M 4/62 | (2006.01) |

(52) U.S. Cl.
CPC ............ *H01M 12/08* (2013.01); *H01M 4/625* (2013.01); *H01M 2010/4271* (2013.01); *Y02E 60/128* (2013.01); *Y02E 60/13* (2013.01)

(56) References Cited

U.S. PATENT DOCUMENTS

| | | | |
|---|---|---|---|
| 2006/0078790 A1 | 4/2006 | Nimon et al. | |
| 2011/0151333 A1* | 6/2011 | Halalay | H01M 2/1653 429/249 |
| 2012/0288736 A1* | 11/2012 | Kim | H01M 2/0207 429/10 |
| 2013/0115485 A1 | 5/2013 | Christensen et al. | |
| 2013/0157149 A1* | 6/2013 | Peled | H01M 4/38 429/405 |
| 2014/0220408 A1* | 8/2014 | Agarwal | H01M 4/663 429/127 |
| 2014/0322614 A1* | 10/2014 | Eitouni | H01M 4/624 429/309 |

OTHER PUBLICATIONS

Takada, Kazunori, "Progress and Prospective of Solid-State Lithium Batteries", Acta Materialia, Jan. 19, 2013, vol. 61, pp. 759-770 (12 pages).

Lee, et al., "Characteristics of a New Type of Solid-State Electrolyte with LiPON Interlayer for Li-Ion Thin Film Batteries", Solid State Ionics 181, pp. 902-906 (2010).

Wilkening, M. et al., "Tuning the Li Diffusivity of Poor Ionic Conductors by Mechanical Treatment: High Li Conductivity of Strongly Defective LiTaO3 Nanoparticles", J. Phys. Chem. C 2008, 112, pp. 9291-9300.

Murugan, R., et al., "Fast Lithium Ion Conduction in Garnet-Type Li7La3Zr2O12", Angew. Chem. Int. Ed. 2007, 46, pp. 7778-7781.

Supplementary European Search Report corresponding to European Patent Application No. 14 83 6875 (10 pages).

* cited by examiner

HYBRID IONIC ELECTRONIC ENERGY STORAGE DEVICE

CROSS REFERENCE

This application claims the benefit of U.S. Provisional Application No. 61/866,078 filed Aug. 15, 2013, and U.S. Provisional Application No. 61/866,456 filed Aug. 15, 2013, the entire contents of which are both herein incorporated by reference.

FIELD OF THE DISCLOSURE

The present disclosure relates to batteries and more particularly to lithium-metal batteries.

BACKGROUND

Batteries are a useful source of stored energy that can be incorporated into a number of systems. Rechargeable lithium-ion ("Li-ion") batteries are attractive energy storage systems for portable electronics and electric and hybrid-electric vehicles because of their high specific energy compared to other electrochemical energy storage devices. In particular, batteries with a form of lithium metal incorporated into the negative electrode afford exceptionally high specific energy (measured in Wh/kg) and energy density (measured in Wh/L) compared to batteries with conventional carbonaceous negative electrodes.

When high-specific-capacity negative electrodes such as lithium are used in a battery, the maximum benefit of the capacity-increase over conventional systems is realized when a high-capacity positive electrode active material is also used. Conventional lithium-intercalating oxides (e.g., $LiCoO_2$, $LiNi_{0.8}Co_{0.15}Al_{0.05}O_2$, and $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g. In comparison, the specific capacity of lithium metale3c+ is about 3863 mAh/g. The highest theoretical capacity achievable for a lithium-ion positive electrode is 1168 mAh/g (based on the mass of the lithiated material), which is shared by $Li_2S$ and $Li_2O_2$. Other high-capacity materials including $BiF_3$ (303 mAh/g, lithiated) and $FeF_3$ (712 mAh/g, lithiated) are identified in Amatucci, G. A. and N. Pereira, *Fluoride based electrode materials for advanced energy storage devices*. Journal of Fluorine Chemistry, 2007. 128(4): p. 243-262. All of the foregoing materials, however, react with lithium at a lower voltage compared to conventional oxide positive electrodes, hence limiting the theoretical specific energy. The theoretical specific energies of the foregoing materials, however, are very high (>800 Wh/kg, compared to a maximum of ~500 Wh/kg for a cell with lithium negative and conventional oxide positive electrodes).

Thus the advantage of using a Li metal negative electrode (sometimes referred to as an anode) is the much higher energy density of the entire cell, as compared to cells with graphitic or other intercalation negative electrode. A disadvantage of using pure Li metal is that lithium is highly reactive. Accordingly, the lithium metal has a propensity to undergo morphology changes, which cause structures having a high surface area to form on and around the negative electrode when the cell is being charged. Exemplary high surface area structures include dendrites and mossy structures.

Dendrites are the most common failure mode for cells with Li metal anodes. The dendrites form with a needle-like structure and can grow through the separator during charging of the cell, resulting in an internal short. "Soft shorts" that burn out rapidly result in a temporary self-discharge of the cell, while "strong shorts" consisting of a higher, more stable contact area can lead to complete discharge of the cell, cell failure, and even thermal runaway. While dendrites typically grow through the separator during charge, shorts can also develop during discharge depending on the external pressure placed on the cell and/or internal volume changes that occur in both the negative and positive electrodes.

Because Li metal is highly electronically conductive, the surface of the Li tends to roughen as the metal is plated and stripped. Peaks in the surface grow as dendrites during charge. During discharge, some smoothing of the dendrites occurs. Nonetheless, there is typically some roughness that remains at the end of discharge. Depending on the depth of discharge, the overall roughness can be amplified from one cycle to the next. Because the metal is essentially at the same electrochemical potential throughout, potential and, to a lesser extent, concentration gradients in the electrolyte phase drive the change in morphology.

Previous Li dendrite growth modeling work has shown that the moving front of a dendrite tends to accelerate during cell charge due to the higher current density localized at the dendrite tip relative to its base particularly with cells incorporating a liquid electrolyte. Application of thermodynamic models has shown that dendrite initiation (i.e., initial roughening of an almost perfectly smooth surface) can be suppressed by applying mechanical stress and selecting solid electrolytes with shear moduli on the order of 10 GPa at room temperature. The same models indicate that surface tension at metal-fluid interfaces is insufficient to suppress dendrite initiation.

Related to dendrite initiation and growth is development of the Li morphology, which tends to increase the electrode surface area with cycling and consumes solvent to generate fresh passivation layers. Formation of high-surface-area mossy Li tends to occur during low-rate deposition from a liquid electrolyte, especially if the salt concentration is high. The high surface area combined with high reactivity of Li and flammability of the organic solvent makes for a very reactive and dangerous cell.

Because of the enormous challenge involved in stabilizing the Li surface chemically and mechanically through the use of electrolyte additives, such that passivation remains in effect over hundreds to thousands of cycles, solid-state Li-conductors have been investigated as potential materials to solve all these issues. However one main limitation of solid-state electrolytes is their low conductivity at room temperature and the resulting low power performance of a solid-state battery. For example, solid state electrolytes have ionic conductivities at room temperature of up to only $10E^{-3}$ S/cm. This is insufficient for power demanding applications, that require ionic conductivities greater than $10E^{-2}$ S/cm.

Moreover, dendrite growth is a result of the non-linear and highly complex nature of current propagation. Dendrite growth can thus be compared to the propagation of a spark during electrical discharge of a plasma which exhibits fractal branching and high complexity. Consequently, the ability to address dendrite growth using symptomatic approaches is limited.

In an attempt to overcome the limitations of known solid state electrolytes, some designs combine a low rate/high energy (much greater than 250 Wh/kg) solid state battery with a high rate/low energy (maximum 5 Wh/kg) capacitor. These approaches are beneficial in applications such as brake energy regeneration in electric vehicles where it is sufficient to store/release a smaller amount of energy (~10% of the total battery capacity) at very high rates. Nonetheless, such approaches are expensive and add more complexity to the battery system due to requirements such as separate housings, additional wires/connectors, etc.

What is needed, therefore, is a battery system that reduces the potential for dendrite formation and the undesired morphological changes in the anode of battery cells having metal anodes and overcomes the rate limitation of solid electrolytes for high-energy batteries.

SUMMARY

An electrochemical cell in one embodiment includes an anode including a form of lithium, a cathode, and a composite electrolyte structure positioned between the anode and the cathode, the composite electrolyte structure configured to conduct lithium ions while being electronically insulating, and exhibiting a high polarizability of localized charges.

In one embodiment, the composite electrolyte structure exhibits a field-dependent ionic conductivity.

In one or more embodiments, the composite electrolyte structure includes crystal defects that act as charge traps for ions.

In one or more embodiments the crystal defects are generated in the composite electrolyte structure by chemical modification, radiation, mechanical treatment, or by thermal treatment.

In one or more embodiments the cathode includes a form of sulfur.

In one or more embodiments the cathode includes an air electrode.

In one or more embodiments the cathode includes a Li-conducting solid electrolyte.

In another embodiment, a battery system includes at least one electrochemical cell including an anode and a cathode spaced apart from the anode by a separator, the anode and cathode configured such that during discharge of the at least one electrochemical cell, lithium ions travel from the anode toward the cathode through the separator in a first direction, and a coil pair positioned in proximity to the at least one electrochemical cell and configured to generate a first magnetic field within the separator oriented in a second direction perpendicular to the first direction.

In one or more embodiments the coil pair is in electrical communication with the at least one electrochemical cell such that the coil pair is powered by the at least one electrochemical cell during a discharge of the at least one electrochemical cell.

In one or more embodiments the first magnetic field has a low maximum strength (µT to mT-range).

In one or more embodiments the coil pair is configured to generate a second magnetic field within the separator oriented in a third direction opposite to the second direction.

In one or more embodiments a battery system includes a battery management system including a memory, a control algorithm stored in the memory, program instructions stored in the memory, and a processor that executes the program instructions to energize the coil pair using the control algorithm.

In one or more embodiments the processor that executes the program instructions to generate the first magnetic field during a first portion of a charge of the at least one electrochemical cell, and generate a second magnetic field within the separator oriented in a third direction opposite to the second direction during a second portion of the charge of the at least one electrochemical cell.

In one or more embodiments the at least one electrochemical cell comprises an electrode sheet and a first coil of the coil pair is laminated along edges of the electrode sheet.

In one or more embodiments the coil pair is configured such that the first magnetic field is concentrated at a location immediately adjacent to a surface of the anode.

In one or more embodiments the at least one electrochemical cell comprises a plurality of electrochemical cells arranged in a cell stack, a first coil of the coil pair is positioned at a first end portion of the cell stack, a second coil of the coil pair is located at a second end portion of the cell stack and the first end portion is opposite to the second end portion.

DESCRIPTION

For the purpose of promoting an understanding of the principles of the disclosure, reference will now be made to the embodiments illustrated in the drawings and described in the following written description. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

Figure 1:
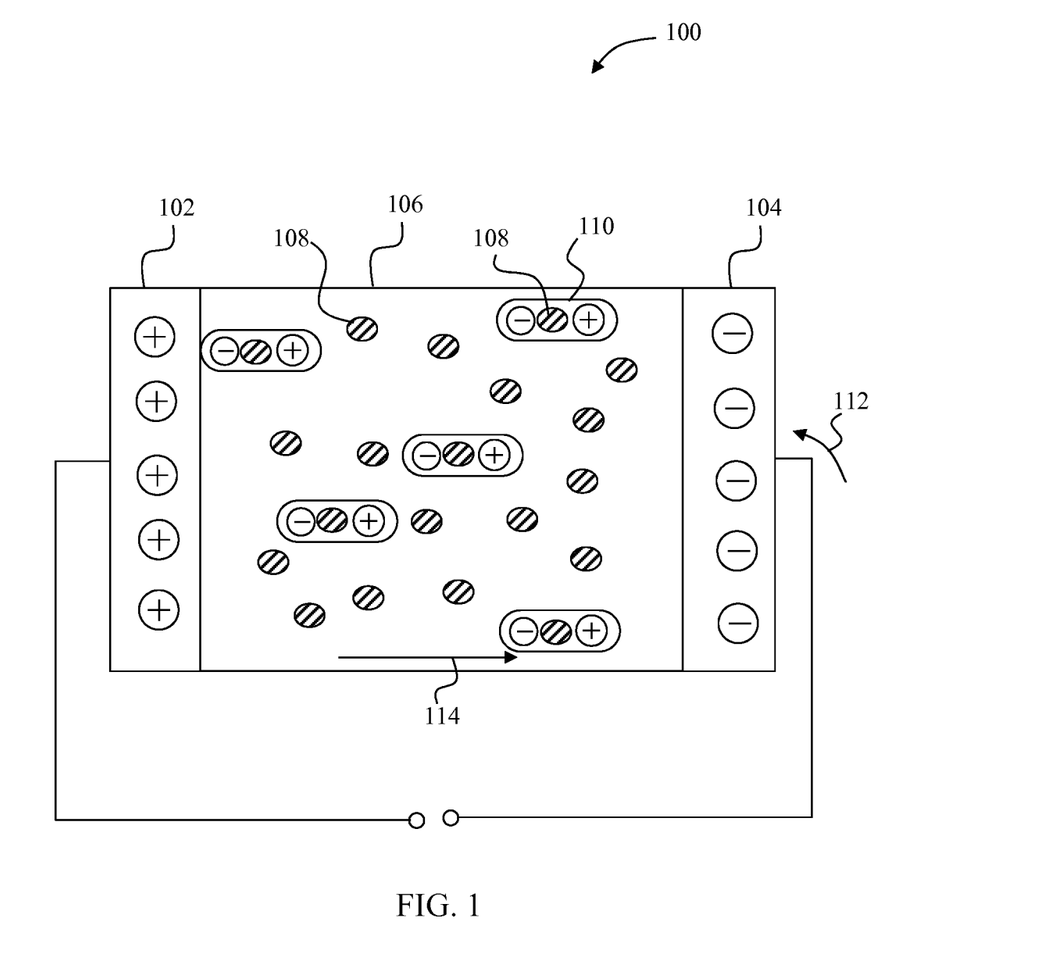
FIG. 1 depicts a simplified schematic of an electrochemical cell including a thin, lithium conducting solid electrolyte that conducts lithium ions and is electronically insulating, but has a high polarizability of localized charges (i.e. trapped electrons or trapped ions) during a capacitor mode of operation.

FIG. 1 depicts an electrochemical cell 100. The electrochemical cell 100 includes an anode 102, a cathode 104, and a composite electrolyte structure 106. The anode 102 includes lithium metal or a lithium alloy metal.

The cathode 104 in various embodiments includes a sulfur or sulfur-containing material (e.g., PAN-S composite), an air electrode, or any other active material or blend of materials that react with and/or insert Li cations and/or electrolyte anions. In some embodiments, the cathode 104 includes Li-conducting solid electrolyte. Materials in the cathode 104 may further include lithium conducting garnets such as NCM-garnet, $LiNi_{0.5}Mn_{1.5}O_4$-garnet mixtures, lithium conducting sulfides or phosphates, $Li_3N$, $Li_3P$, LIPON. Other materials in the cathode 104 may include electronically conductive additives such as carbon black, and a binder material. The cathode materials are selected to allow sufficient electrolyte-cathode interfacial area for a desired design.

The composite electrolyte structure 106 is a thin, lithium conducting solid electrolyte that conducts lithium ions and is electronically insulating, but has a high polarizability of localized charges (i.e. trapped electrons or trapped ions). The composite electrolyte structure 106 shows a field-dependent (i.e. magnitude and/or direction) ionic conductivity. This is accomplished by incorporating grain boundaries or other crystal defects 108 that act as charge traps for ions 110. The ions 110 can be Li-ions or other transition metal or alkaline metal ions. The defects/charge traps 108 can be generated in the ion-conductor structure (examples for Li-ion conductor materials include LiPON, $Li_2CO_3$, $LiTaO_3$, and $Li_7La_3Zr_2O_{12}$) by chemical modification, radiation, mechanical treatment (e.g. ultra sound) or by thermal treatment.

FIG. 1 depicts the electrochemical cell 100 operating in a "capacitor mode" during charge of the cell. In this mode of operation, current is applied to the cell 100 as indicated by the arrow 112. Electrostatic energy is stored in the electric field 114 that is generated by separation of charges between the anode and the cathode. In discharge, the current direction and field vectors would be reversed. The composite electrolyte structure 106 is ionically and electronically insulating during this mode. Thus, there is no ionic current and the composite electrolyte structure 106 is polarized. The maximum current is therefore determined by the ohmic conductivity of the leads, the current collectors and the electrode matrix, but not by the composite electrolyte structure 106, since ions 110 are only polarized and not transported. The capacity will be limited by the number of polarizable charges. Appropriate ion doping (e.g. by ion implantation) during production and creation of a high defect density of the composite electrolyte structure 106 determines how many localized ions 110 are available.

In addition to the number of ions 110 another important material property for the "capacitor mode" is the polarizability of the trapped ions 110. In contrast to conventional dielectric materials, where electrons are polarized to achieve maximum dielectric constant, the ions 110 have a much higher mass "m" (4 orders of magnitude higher than electrons). This greatly reduces their tunneling probability "P" ($P \sim e^{\{-sqrt(2m)\}}$) through the composite electrolyte structure 106 at a given field. Because the tunneling probability determines dielectric breakdown through a dielectric, a cell using an ionic dielectric can have a much higher breakdown field "E_bd" and therefore store more energy ($\sim (E\_bd)^2$).

Figure 2:
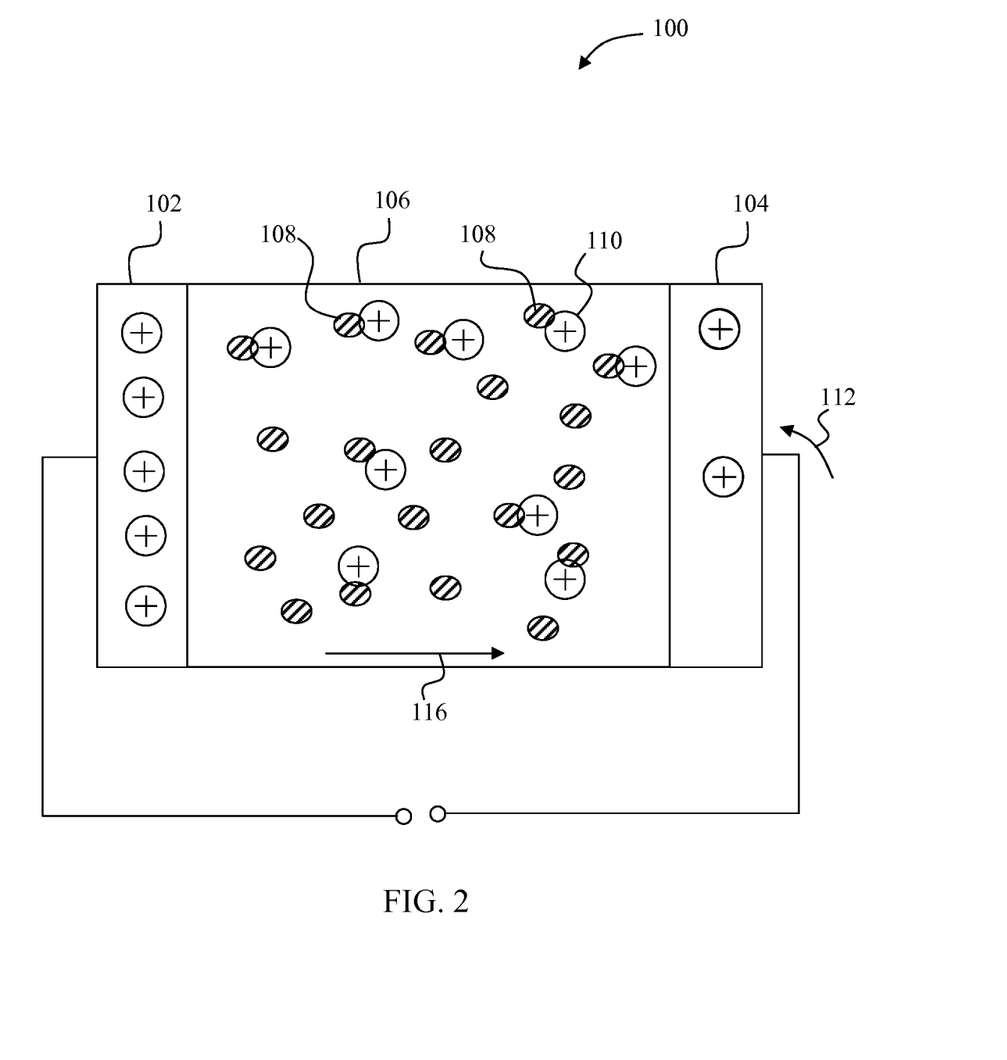
FIG. 2 depicts the electrochemical cell of FIG. 1 during a battery mode of operation.

FIG. 2 shows the "high capacity/low power" mode of the cell 100 during a discharge reaction. This mode is activated when a critical field is reached between the anode and the cathode. The composite electrolyte structure 106 becomes ionically conductive (Ionic current=f(U,t) and as the ions 110 "hop" between the defects 108 generally in the direction of the arrow 116 and the actual electrochemical reaction happens at the electrodes 102 and 104. Thus, electronic current is equal to ionic current and there is no polarization of the composite electrolyte structure 106. During charging, the current direction and ionic movement are reversed. Consequently, energy is stored (or generated) electrochemically in the reaction between anode and cathode materials like in a prior art high-energy Li-Ion battery.

The cell 100 is thus discharged/charged due to an ionic current that flows through the composite electrolyte structure 106 initiated by applying a certain threshold voltage above the window for the "capacitor mode". The maximum current is determined by the ionic conductivity of the composite electrolyte structure 106 and/or by the kinetics of the dominant cell reaction. The maximum capacity is determined by the electrochemical couple, the electrode loading, and the transport characteristics of the electrodes. When the cell 100 returns to "capacitor mode" the composite electrolyte structure 106 is again ionically insulating and energy can be stored in an electric field.

The cell 100 thus uses a field-dependent solid electrolyte to store energy at high rate but with low capacity and a larger fraction of the total energy content at lower rate. This allows the use of two different "energy reservoirs" within the same cell without additional components. The cell 100 provides robust design based on one particular material property with no additional components. The cell 100 provides a "capacitor-like" high rate capability combined with high energy density of a lithium battery (e.g. Li/Sulfur, Li/Oxygen or High Energy NCM chemistries). The cell 100 overcomes current limitation of solid state batteries and uses low conductivity (i.e. high polarizability) of solid ion conductors to store additional energy electrostatically.

The cell 100 further increases electrostatic energy content due to polarization of heavy ions in contrast to light electrons of "conventional" capacitors that tend to initiate dielectric breakdown. Advantageously, the cell 100 is easily integrated into existing manufacturing processes because only the design of the ionic conductor needs to be changed.

The above described embodiment uses the unique advantage of solid electrolytes to localize charges (ions) in a solid structure allowing the creation of internal electric fields to store energy electrostatically in a certain potential window while still operating electrochemically by ion conduction in a different window. Accordingly, the cell 100 can be a solid state ion conductor with field-dependent conductivity. The cell 100 can be configured with a solid state ion conductor having a defined threshold field/voltage that turns its conductivity "on" or "off". The cell 100 provides a unique combination of high power capacitor characteristics with high energy characteristics of a Li-battery.

While the disclosure has been described in the context of energy storage applications, the disclosure could also be used as a unique switching device for ionic currents (e.g. in lab-on-chip application or other microionics/fluidics areas).

In another embodiment, an electrochemical cell is configured to ameliorate formation of dendrites using the Lorentz force "F". The Lorentz force "F" is a known quantity in physics that acts on a moving charged particle in the presence of electric field (E) and/or magnetic field (B). The Lorentz force is determined by the following equation:

$$F=q(E+v\times B)$$

wherein "q" is the particle charge
"v" is velocity
"E" is an electric field, and
"B" is a magnetic field.

Figure 3:
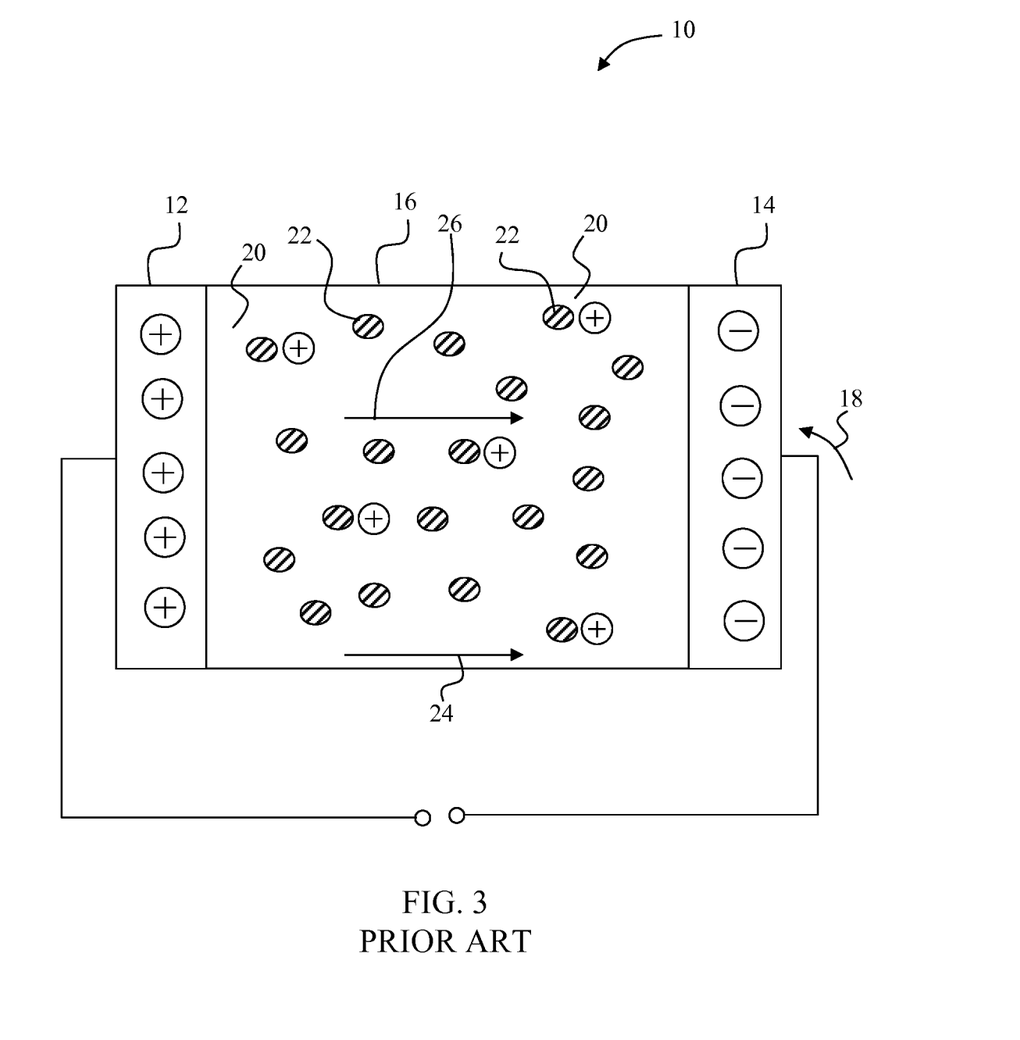
FIG. 3 depicts a simplified schematic of a prior art electrochemical cell.

In a battery an electric field E is generated between the electrodes during charge/discharge. By way of example, FIG. 3 depicts a prior art electrochemical cell 10 which includes an anode 12, a cathode 14, and a separator 16. During discharge of the cell 10, current moves in the direction of the arrow 18 external to the cell 10 while charged ions 20 move from the anode 12 to the cathode 14 by migration through the electrolyte either by liquid phase transport in liquid electrolytes or by hopping between potential traps 22 for solid electrolytes or by a similar mechanism in the direction of the arrow 24. The moving charged ions 20 within the cell 10 generate an electric field 26 within the cell 10. The electric field 26 is perpendicular to the surface of the anode 12 and parallel to the ionic motion (q positive)/electronic motion (q negative) v in the electrolyte (for ions)/electrode (for electrons) in close proximity to the anode surface. The electrolyte can be a liquid, a gel, a polymer or a solid. Consequently, a Lorentz force is generated which is in the same direction as the electric filed 26 which is substantially perpendicular to the surface of the anode 12.

In the prior-art cell 10 the current direction is parallel to the electric field in the cell. Unavoidable surface imperfections (kinks, whiskers, defects . . . ) on the surface of the anode 12 lead to local field amplification and the inhomogeneity of the resulting current distribution becomes worse.

The field direction is reversed when changing between charge and discharge mode. For a given field direction, electrons and ions always move in opposite directions due to the different signs of their electric charge. The Lorentz forces are thus always perpendicular to the surface of the anode 12, and this force, along with the direction of the ionic and electronic motion determines where Li (or metal) deposition/stripping occurs in the cell. Consequently, dendrite formation is driven by the Lorentz force in a direction directly toward the cathode 14.

Figure 4:
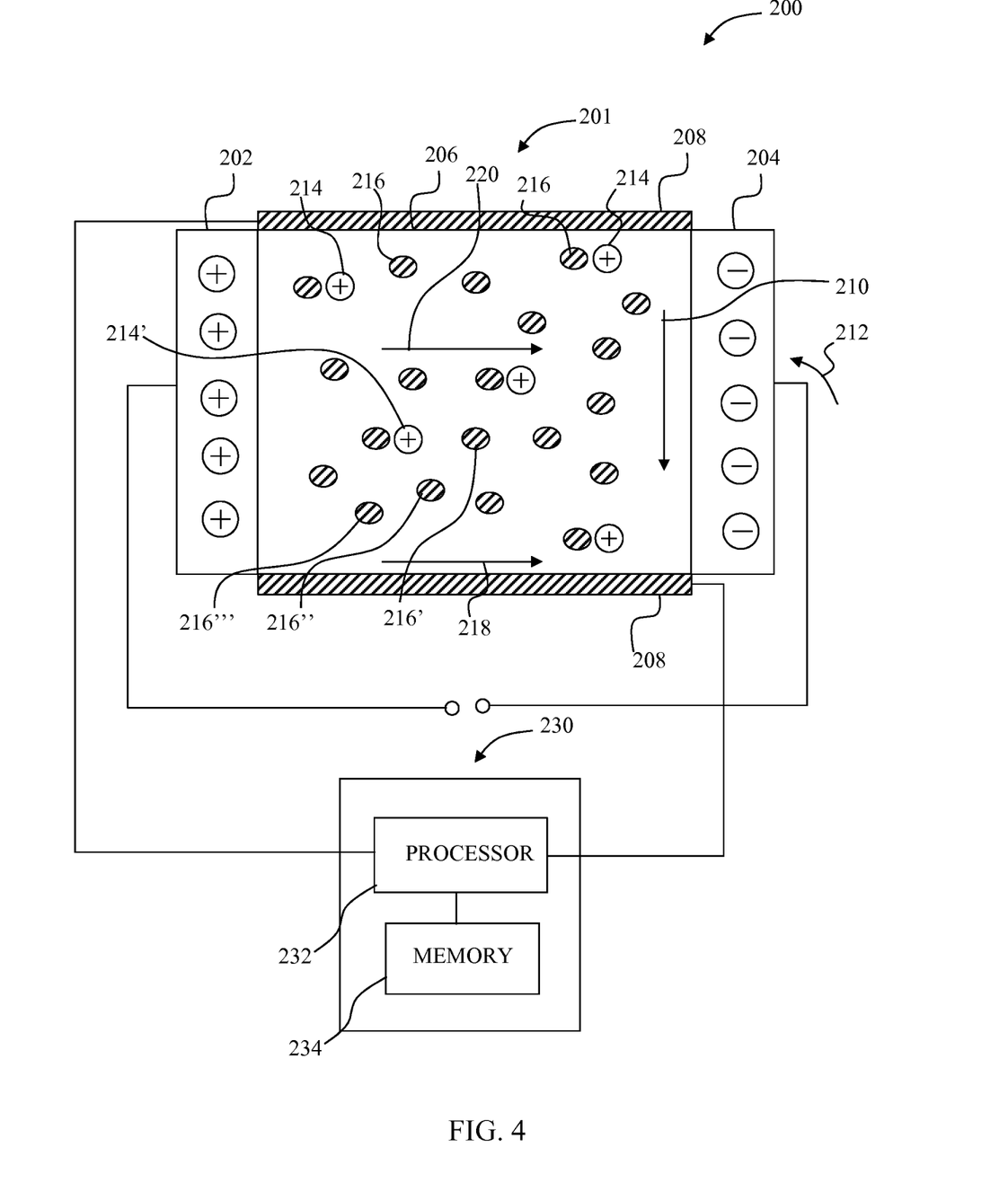
FIG. 4 depicts a simplified schematic of an electrochemical cell including coils which generate a magnetic field that is parallel to the surface of the anode, and perpendicular to the electric field generated by the cell during charge and discharge of the cell.

FIG. 4 depicts one embodiment of an battery system 200 in accordance with the principles of the disclosure. The system 200 includes an electrochemical cell 201 with an anode 202, a cathode 204, and a separator 206. The anode 202 includes lithium metal or a lithium alloy metal. While only a single cell 201 is depicted, in some embodiments a plurality of cells are provided.

The cathode 204 in various embodiments includes a sulfur or sulfur-containing material (e.g., PAN-S composite), an air electrode, or any other active material or blend of materials that react with and/or insert Li cations and/or electrolyte anions. In some embodiments, the cathode 204 includes Li-conducting solid electrolyte. Materials in the cathode 204 may further include lithium conducting garnets such as NCM-garnet, $LiNi_{0.5}Mn_{1.5}O_4$-garnet mixtures, lithium conducting sulfides or phosphates, $Li_3N$, $Li_3P$, LIPON. Other materials in the cathode 204 may include electronically conductive additives such as carbon black, and a binder material. The cathode materials are selected to allow sufficient electrolyte-cathode interfacial area for a desired design.

The separator 206 is a lithium conducting layer that conducts lithium ions and is electronically insulating. In different embodiments, the separator may be made from any desired material. In some embodiments, the separator is a thin, lithium conducting solid electrolyte that conducts lithium ions and is electronically insulating, but has a high polarizability of localized charges (i.e. trapped electrons or trapped ions) as was described above with respect to the embodiment of FIGS. 1 and 2.

The system 200 further includes a pair of coils 208. The coils 208 are located on the sides of the separator 206 which extend between the anode 202 and the cathode 204. The coils 208 are oriented such that when they are energized, they create a magnetic field 210 which extends through the separator 206 along a vector which is parallel to the surfaces of the anode 202 and the cathode 206 which are adjacent to the separator 206.

Consequently, when the cell 201 is discharged, current moves in the direction of the arrow 212 external to the cell 201 while charged ions 214 move from the anode 202 to the cathode 204 by migration, diffusive transport or hopping between potential traps or defects 216 in the direction of the arrow 218. The moving charged ions 214 within the system 200 thus generate an electric field 220 within the cell 201. The magnetic field 210 is perpendicular to the electric field 220. Therefore, the resulting Lorenz force is no longer only controlled by the electric field 220 and perpendicular to the anode surface, but has a component parallel to the anode surface. Using the fields depicted in FIG. 4, the Lorenz force tends to force the moving ionic particles 214 downwardly.

By way of example, one of the ionic particles 214 in FIG. 4 is identified as ionic particle 214' while two defects 216 are identified as defects 216' and 216". Without the magnetic field 210, the ionic particle 214' would move toward the cathode 204 by hopping to the particle 216'. Because of the Lorenz force which results when the magnetic field 210 is applied, the ionic particle 214' instead hops to the ionic particle 216". Accordingly, dendrite formation is suppressed resulting in a more "plate" or "film-like" metal deposition.

The extent of movement generated using the coils 208 will vary depending upon the strength of the magnetic field. In some embodiments, a magnetic field 210 is generated that results in "skipping" of the charged particles along the electrode surface while depositing/stripping material parallel to the surface and not in the unwanted perpendicular direction. For example, in a sufficiently strong magnetic field 210, the ionic particle 214' would be forced to move to the defect 216''' in a path parallel to the surface of the anode 202.

The energy consumption of the coils 208 is very low, because the generated magnetic field 210 does not transmit much energy, since it is only used to deflect mesoscopic charge carriers like ions and electrons and does not perform significant work. The field strength can also be low ($\mu T$ to mT-range) due to the low mass of the involved charge carriers and the small distances they need to travel on the electrode surface to achieve the "flat" trajectories in skipping of the charged particles. Energy consumption is therefore dominated by the resistance of the metallic wire used to create the coil. Metals like copper or silver can provide sufficient conductivity to minimize ohmic energy losses.

The coils 208 in one embodiment are operated under the control of a battery management system 230. The connection to the battery management system 230 can be made by additional connectors/tabs similar to the connectors/tabs that are used to connect the anode and cathode in state-of-the-art batteries. The battery management system 230 includes a processor 232 that executes program instructions stored in a memory 234 to energize the coils in accordance with a control algorithm. In some embodiments, the coils are energized only when the cell 201 is being charged or discharged. In some embodiments, the coils are energized only when the cell 201 is being charged. To this end, the battery management system 230 in some embodiments obtains input from voltmeters and/or amp meters associated with the system 200 and uses that input in controlling the coils.

In some embodiments, the coils are controlled to generate magnetic fields in opposite directions. For example, for a first period of charge or discharge a field in the direction of the field 210 of FIG. 4 is generated. For a next period of charge or discharge, which may be during the same charging or discharging event or a subsequent charging or discharging event, a field in the direction opposite to the field 210 of FIG.

4 is generated. In some embodiments the coils can even be connected in series with each other and the electrochemical cell itself. By this the cell or charging source would power the coils directly and the current direction (i.e. field direction) and magnitude (i.e. field strength) would be directly proportional to the electric current that is released/stored by the cell. It can be beneficial to have this kind of coupling between cell and coils for certain applications and one could even avoid a separate routine of the battery management system for the coils. In some embodiments, the coils are controlled or configured to generate a magnet field in a first direction during a charge and in a second direction during a discharge.

The coils used to generate a magnetic field can be arranged in a variety of locations depending upon the desired Lorentz force. To create highly homogeneous fields along an electrode surface the coils can be arranged in Helmholtz or Maxwell geometry if desired.

Figure 5:
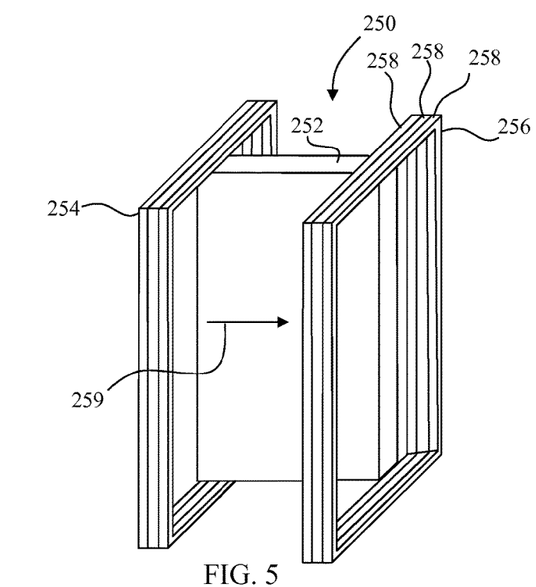
FIG. 5 depicts a front plan view of a single electrochemical cell with coils provided on the sides of the cell.
Figure 6:
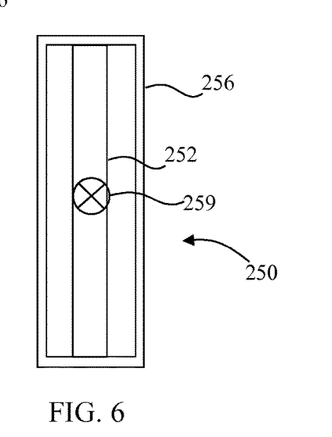
FIG. 6 depicts a side plan view of the cell of FIG. 5 showing the coil turns.

Moreover, the coils can be implemented in a variety of manners. For example, FIGS. 5 and 6 depict an individual cell 250 which includes an electrode sheet or tape 252. To obtain coils 254 and 256, a thin insulated wire (copper, aluminum, silver etc. . . . ) is simply laminated along the edges of the electrode sheet 252. As shown in FIG. 5, coil 256 has three turns 258. The number of turns "n" determines the magnetic field strength at a given current "I" through the wire. Additionally, the strength of the field 259 needs not be uniform along the coil. Consequently, the coils can be more concentrated at a desired location such as immediately above and below the cell 250 at locations closest to the anode surface.

Figure 7:
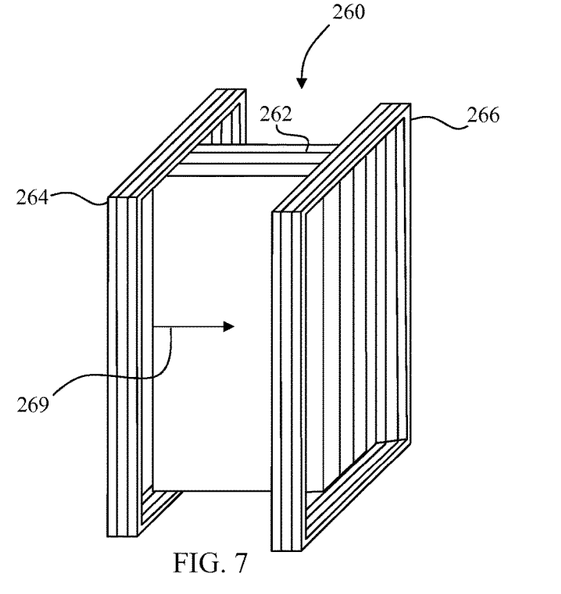
FIG. 7 depicts a front plan view of a battery stack that includes two coils which provide a magnetic field for multiple cells within the cell stack.
Figure 8:
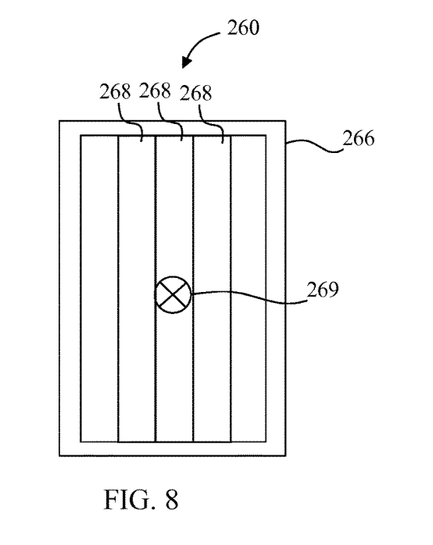
FIG. 8 depicts a side plan view of the battery stack of FIG. 7.

The disclosure can further be implemented with a cell stack. For example, FIG. 7 depicts a front view of a cell stack 260 which includes coils 264 and 266. As shown in FIG. 8 which is a side view of the cell stack 260, coils 264 and 266 provide a magnetic field 269 for several individual cells 268 in the cell stack 260.

The fundamental reason for dendrite growth during electrochemical plating in a Li-metal battery is an inhomogeneous current distribution caused by non-uniform current densities due to current collector placement, temperature gradients, surface defects and other factors, may lead to non-uniform shapes of Li metal. In the embodiments disclosed herein, electromagnetic field coils operably associated with the anode smoothen the field/current distribution by application of a homogeneous electromagnetic field. The embodiments described herein thus provide an additional parameter to control the battery performance and lifetime, which is not available in a prior-art lithium battery or any other electrochemical cell.

The disclosed embodiments thus provide dendrite suppression in batteries with metal electrodes (such as Lithium) by electromagnetic fields. Field coils in different embodiments are included in electrode laminate, battery cell stack, battery housing or even on battery pack level and controlled to generate magnetic fields parallel to electrode surfaces. Consequently, charge carriers (ions and electrons) are forced on flat trajectories that run along the electrode surface and suppress vertical plating/stripping that increases inhomogeneities.

Unlike approaches based on magnetic induction, this disclosure is not limited to metallic electrodes, because it is based on the fundamental Lorentz effect (works with DC current) that acts on charges in general and does not require metallic conductivity, ferromagnetism of a given material and/or alternating currents or high frequency fields. Consequently, there is no limitation to ferromagnets, metals, high frequency fields etc. . . . . The coils disclosed herein are independent of cell chemistry and applicable to liquid, gel, polymer and solid battery types. In different embodiments, coils are provided in Helmholtz or Maxwell geometry to create very homogeneous fields, if desired.

The embodiments disclosed above thus enable the use of highly reactive metals such as Li metal, which offers a higher energy content than batteries that do not include Li metal. The disclosure can be easily included in any electrochemical stack where non-uniform material plating is a critical problem.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. A battery system comprising:
   at least one electrochemical cell including an anode and a cathode spaced apart from the anode by a separator, wherein during discharge of the at least one electrochemical cell, lithium ions travel from the anode toward the cathode through the separator in a first direction;
   a coil pair positioned in proximity to the at least one electrochemical cell which generates a first magnetic field within the separator oriented in a second direction perpendicular to the first direction; and
   a battery management system, the battery management system including:
   a memory;
   a control algorithm stored in the memory;
   program instructions stored in the memory; and
   a processor that executes the program instructions to energize the coil pair using the control algorithm.

2. The battery system of claim 1, wherein the processor that executes the program instructions to:
   generate the first magnetic field during a first portion of a charge of the at least one electrochemical cell; and
   generate a second magnetic field within the separator oriented in a third direction opposite to the second direction during a second portion of the charge of the at least one electrochemical cell.

3. The battery system of claim 1, wherein:
   the at least one electrochemical cell comprises an electrode sheet; and
   a first coil of the coil pair is laminated along edges of the electrode sheet.

4. The battery system of claim 1, wherein the coil pair concentrates the first magnetic field at a location immediately adjacent to a surface of the anode.

5. The battery system of claim 1, wherein:
   the at least one electrochemical cell comprises a plurality of electrochemical cells arranged in a cell stack;
   a first coil of the coil pair is positioned at a first end portion of the cell stack;
   a second coil of the coil pair is located at a second end portion of the cell stack; and
   the first end portion is opposite to the second end portion.

6. The battery system of claim 1, wherein the coil pair is in electrical communication with the at least one electrochemical cell such that the coil pair is powered by the at least one electrochemical cell during a discharge of the at least one electrochemical cell to generate the first magnetic field.

7. The battery system of claim 6, wherein the first magnetic field has a low maximum strength ($\mu$T to mT-range).

8. The battery system of claim 6, wherein the coil pair generates a second magnetic field within the separator oriented in a third direction opposite to the second direction.

9. A method of operating a battery system comprising:
forcing lithium ions to travel within an electrochemical cell between an anode and a cathode within a separator in a first direction; and
generating a first magnetic field within the separator oriented in a second direction perpendicular to the first direction using a coil pair positioned in proximity to the at least one electrochemical cell by executing program instructions stored within a memory with a processor using a control algorithm.

10. The method of claim 9, wherein:
generating the first magnetic field comprises generating the first magnetic field during a first portion of a charge of the electrochemical cell; and
the method further comprises generating a second magnetic field within the separator oriented in a third direction opposite to the second direction during a second portion of the charge of the electrochemical cell.

* * * * *